(12) United States Patent
Lafont et al.

(10) Patent No.: US 8,613,404 B2
(45) Date of Patent: Dec. 24, 2013

(54) TAKE-UP DEVICE FOR THRUST FORCES WITH CONNECTING RODS FOR AIRCRAFT ENGINE ATTACHMENT PYLON, INTEGRATING THREE ALIGNED BALL JOINTS

(75) Inventors: Laurent Lafont, Pechbusque (FR);
Stephane Combes, Buzet sur Tarn (FR);
Stephane Levert, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 71 days.

(21) Appl. No.: 13/239,939

(22) Filed: Sep. 22, 2011

(65) Prior Publication Data
US 2012/0080555 A1 Apr. 5, 2012

(30) Foreign Application Priority Data
Oct. 1, 2010 (FR) ...................................... 10 57963

(51) Int. Cl.
*B64B 1/24* (2006.01)
(52) U.S. Cl.
USPC ........................................... 244/54; 244/131
(58) Field of Classification Search
USPC .................................................. 244/54, 131
See application file for complete search history.

(56) References Cited

U.S. PATENT DOCUMENTS

| | | | | |
|---|---|---|---|---|
| 6,173,919 B1 * | 1/2001 | Le Blaye | ......................... | 244/54 |
| 6,330,995 B1 * | 12/2001 | Mangeiga et al. | ............ | 248/554 |
| 6,494,403 B2 * | 12/2002 | Jule et al. | ......................... | 244/54 |
| 7,021,585 B2 * | 4/2006 | Loewenstein et al. | .......... | 244/54 |
| 7,165,743 B2 * | 1/2007 | Pasquer et al. | .................. | 244/54 |
| 7,325,770 B2 * | 2/2008 | Chevalier et al. | ............... | 244/54 |
| 8,322,651 B2 * | 12/2012 | Levert et al. | ..................... | 244/54 |
| 2001/0025902 A1 | 10/2001 | Jule et al. | | |
| 2010/0181417 A1 | 7/2010 | Combes et al. | | |

FOREIGN PATENT DOCUMENTS

EP   1 136 355 A1   9/2001
FR   2 917 713 A1   12/2008

OTHER PUBLICATIONS

French Preliminary Search Report issued Jun. 29, 2011, in Patent Application No. FR 1057963 (with English translation of Category of Cited Documents).

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

The present invention relates to a take-up device for thrust forces (14) for an aircraft engine attachment pylon (4), comprising a first fitting (194) attached to a rigid structure (108) of the attachment pylon, and two lateral connecting rods (14a) for take-up of thrust forces. It also comprises an axis system (190) bearing three first ball joint organs (192a, 196a) arranged along the latter and belonging respectively to a primary ball joint (192) and two secondary ball joints (196) arranged on either side of the primary ball joint, the first fitting (194) integrating a second ball joint organ (192b) cooperating with the first organ (192a) of the primary ball joint (192), and an end of each of the two connecting rods (14a) integrating a second ball joint organ (196b) cooperating respectively with the first organs (196a) of the two secondary ball joints (196).

14 Claims, 9 Drawing Sheets

TAKE-UP DEVICE FOR THRUST FORCES WITH CONNECTING RODS FOR AIRCRAFT ENGINE ATTACHMENT PYLON, INTEGRATING THREE ALIGNED BALL JOINTS

TECHNICAL FIELD

The present invention relates to an aircraft engine attachment pylon intended to be inserted between an aircraft wing system and the concerned engine, and more particularly its thrust take-up device comprising two lateral connecting rods.

This type of attachment pylon, or EMS (Engine Mounting Structure), makes it possible to suspend an engine below the wing system of the aircraft, or to mount said turboshaft engine above that same wing system.

The invention can be used on any type of aircraft preferably equipped with turbojet engines or turboprops.

BACKGROUND OF THE INVENTION

Such an attachment pylon is in fact provided to form the connecting interface between an engine and a wing system of the aircraft. It makes it possible to transmit, to the structure of said aircraft, the forces generated by its associated engine, and also allows the conveyance of the fuel, the electrical, hydraulic and air systems between the engine and the aircraft.

FIG. 1 shows an engine assembly for an aircraft, as known from document WO 2009/037267. This engine assembly 1 is intended to be fastened under a wing 2 of said aircraft. It includes an attachment pylon or device 4, as well as an engine 6 such as a turbojet engine attached under said device 4.

Overall, the attachment device 4 includes a rigid structure 8, also called primary structure, supporting attachment means for the engine 6, these attachment means having a plurality of engine attachments 10, 12, as well as a device for taking up thrust forces 14 generated by the engine 6.

For information, it should be noted that the assembly 1 is intended to be surrounded by a nacelle (not shown), and that the attachment pylon 4 includes another series of fasteners (not shown) fastened on the rigid structure 8 and making it possible to suspend said assembly 1 under the wing system 2 of the aircraft.

In the rest of the description that follows, by convention, X refers to the longitudinal direction of the pylon 4, which can also be likened to the longitudinal direction of the turbojet engine, said direction X being parallel to a longitudinal axis 5 of said turbojet engine 6. On the other hand, Y refers to the direction oriented transversely relative to the pylon 4 and also comparable to the transverse direction of the turbojet engine 6, and Z the vertical direction of the height, these three directions X, Y and Z being orthogonal relative to each other.

The terms "front" and "back" should be considered relative to a direction of travel of the aircraft encountered after the thrust exerted by the turbojet engine 6, said direction being shown diagrammatically by arrow 7.

FIG. 1, showing the prior art, shows the two engine attachments 10, 12, the take-up device for thrust forces 14, the rigid structure 8 of the attachment device 4, as well as a plurality of secondary structures fastened on the rigid structure 8. These secondary structures ensuring the segregation and maintenance of the systems while supporting aerodynamic fairing elements will be described below.

It is indicated that the turbojet engine 6 has, at the front, a fan case 18 with large dimensions delimiting an annular fan channel 20, and has, toward the back, a central case 22 with smaller dimensions, containing the core of said turbojet engine. The cases 18 and 22 are of course secured to each other.

As shown in FIG. 1, two engine attachments 10, 12 of the device 4 are provided, and are respectively called forward engine attachment and aft engine attachment. The forward engine attachment 10 is inserted between a forward end of the rigid structure 8, and an upper part of the fan case 18. The aft engine attachment 12 is inserted between the rigid structure 8 and the central case 22, or the gas exhaust case situated further back.

The rigid structure 8 makes it possible to convey forces between the turbojet engine and the wing system. It assumes the form of a box extending from back to front, substantially in direction X. This metal box is then traditionally formed by assembling upper and lower longerons and side panels connected to each other via transverse inner stiffening ribs (not visible in FIG. 1), which each assume the form of a rectangle oriented in plane YZ.

Still in reference to FIG. 1, the secondary structures of the pylon 4 include a forward aerodynamic structure 24, an aft aerodynamic structure 26, a connecting fairing 28 of the forward and aft aerodynamic structures, and a lower aft aerodynamic fairing 30, also called "shield" or "APF" (Aft Pylon Fairing).

More precisely, the forward aerodynamic structure 24 is placed in the lower forward extension of the wing system 2 and above the primary structure 8. It is fixedly mounted on the rigid structure 8, and has an aerodynamic profile function between an upper part of the fan cowls hinged thereon, and the leading edge of the wing system. This forward aerodynamic structure 24 then has not only an aerodynamic fairing function, but also makes it possible to place, segregate and convey different systems (air, electric, hydraulic, fuel). Furthermore, the forward part of this structure 24 not being in contact with the rigid structure 8, a heat exchanger is usually inserted in the space defined between these two elements.

Directly in the rear extension of said structure 24, still under the wing system and mounted above the rigid structure 8, is a connecting fairing 28, also called "karman." Then, still toward the rear, the connecting fairing 28 is extended by the aft aerodynamic structure 26, which contains part of the equipment of the pylon. This structure 26 is preferably situated completely behind relative to the rigid structure 8, and is therefore attached under the wing system of the aircraft.

Lastly, under the rigid structure 8 and the aft aerodynamic structure 26 is the lower aft aerodynamic fairing 30, also called "shield" or "Aft Pylon Fairing." Its essential functions are the formation of a thermal barrier, also called firewall, serving to protect the pylon and the wing system from the heat given off by the primary flow, and the formation of an aerodynamic continuity between the output of the engine and the attachment pylon. In a known manner, the aforementioned fairing 30 includes a heat protection floor 32 provided with an outer surface intended to be hugged by a primary flow of the engine that it partially delimits, radially outwardly, this primary flow escaping the hose 33 of the engine being diagrammatically shown by arrow 36. Moreover, the fairing 30 also includes two side panels 44, which are provided to be outwardly hugged by a secondary flow from the engine diagrammatically shown by arrow 38, due to their installation in the annular secondary flow channel 40 of the engine, and/or as output therefrom.

It should be noted that in the described preferred embodiment where the engine 6 is intended to be suspended under the wing system of the aircraft, the heat protection floor 32 for protecting the pylon and the wing system from the primary flow 36 forms a lower portion of the fairing 30. Naturally, this floor constitutes an upper portion of the fairing in the alternative case where the engine is intended to be installed above the wing system.

Lastly, as shown in FIG. 1, it is provided that the forward end of the floor 32 hugs the upper aft end of the hose 33, or it is brought much closer to said same aft end of the hose 33.

As mentioned above, the pylon incorporates a take-up device for thrust forces comprising, as in particular disclosed in document WO 2007/000456, two lateral connecting rods arranged symmetrically to each other. One of the ends of each connecting rod is articulated on a rudder bar, which in turn is articulated on a fitting secured to the rigid structure of the attachment pylon. The other end of each connecting rod is mounted on the engine case, preferably on the intermediate case.

Although this design is very widespread, it can be improved, in particular in terms of bulk.

BRIEF DESCRIPTION OF THE INVENTION

The invention therefore aims to at least partially resolve the drawback mentioned above, relative to the embodiments of the prior art.

To that end, the invention relates to a take-up device for thrust forces for an aircraft engine attachment pylon, said device comprising a first fitting intended to be secured to a rigid structure of the attachment pylon, as well as two lateral connecting rods for take-up of thrust forces.

According to the invention, it also comprises an axis system bearing three first male ball joint organs arranged along the latter and belonging respectively to a primary ball joint and two secondary ball joints arranged on either side of the primary ball joint, said first fitting integrating a second female ball joint organ cooperating with said first organ of the primary ball joint, and an end of each of the two connecting rods integrating a second female ball joint organ cooperating respectively with the first organs of the two secondary ball joints.

The invention is remarkable in that it proposes a design for a take-up device for thrust forces that is radically different from earlier designs, based on the use of a rudder bar. This rudder bar is in fact removed in favor of an axis system, preferably transversely oriented, supporting three ball joints, including two situated laterally making it possible to connect the connecting rods. Preferably, the axis system passes through three coaxial bores respectively formed in the first three male ball joint organs.

This results in a decrease in the overall bulk of the take-up device, which is accompanied by a reduction of its mass. With this reduced bulk of the take-up device for thrust forces, in particular in the direction of the height in which the engine and the rigid structure of the pylon are superimposed, these two elements can be brought closer to each other, and the ground clearance can thus advantageously be increased. Alternatively, the ground clearance can be kept, and the height of the rigid structure increased, to obtain a greater mechanical strength thereof.

Preferably, the centers of the primary and secondary ball joints are aligned.

Preferably, the device also comprises two second fittings intended to be secured to the rigid structure of the attachment pylon, the second fittings being arranged so that each secondary ball joint is arranged between one of these second fittings and the primary ball joint, in the direction of the axis system, and each second fitting is passed through with play by said axis system.

Due to the presence of play, no force passes through the second fittings in the normal configuration. However, in the event of a failure occurring on the force path between one of the connecting rods and the axis system, such as for example the breaking of the connecting rod, the thrust forces then only passing through the other connecting rod are then introduced into the rigid structure via the first fitting, and via the second fitting associated with the still-active connecting rod, after the play between the axis system and said second fitting has been consumed. The thrust forces are distributed between the two aforementioned fittings, meaning that none of them need to be over-dimensioned. This results in gains in terms of mass and bulk so as to ensure the failsafe function.

Preferably, the other end of the lateral connecting rods for taking up of thrust forces is intended to be connected to the engine, preferably on the intermediate case thereof.

The invention also relates to an aircraft engine attachment pylon comprising a rigid structure as well as a take-up device for thrust forces as described above.

The invention also relates to an aircraft engine assembly comprising an engine attachment pylon as described above, as well as an engine fastened on said pylon, preferably of the turbojet engine or turboprop type.

Lastly, the invention relates to an aircraft comprising at least one engine assembly as described above.

Other advantages and features of the invention will appear in the detailed non-limiting description below.

BRIEF DESCRIPTION OF THE DRAWINGS

This description will be done in light of the appended drawings, among which:

FIG. 5b shows a cross-sectional view along line Vb-Vb of FIG. 5a;

FIG. 5c shows a side view of that shown in FIG. 5a;

DETAILED DESCRIPTION OF PREFERRED EMBODIMENTS

Figure 2:
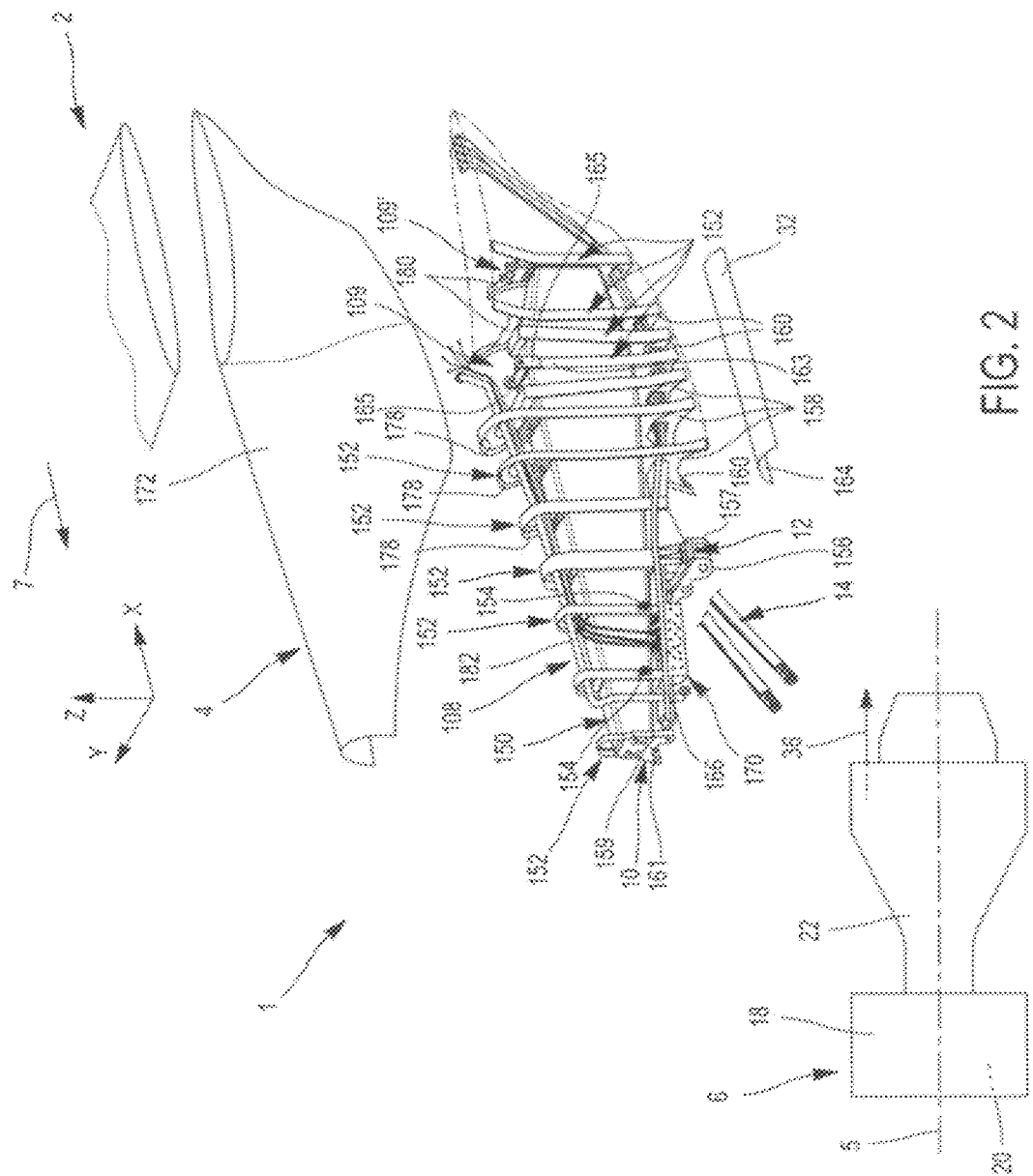
FIG. 2 shows an exploded perspective view of an aircraft engine assembly, according to one preferred embodiment of the present invention.

FIG. 2 shows an exploded view of an aircraft engine assembly intended to be fastened under a wing 2 of said aircraft, this assembly 1 including an attachment device 4 according to one preferred embodiment of the present invention, as well as an engine 6 such as a turbojet engine attached under said device 4.

Figure 1:
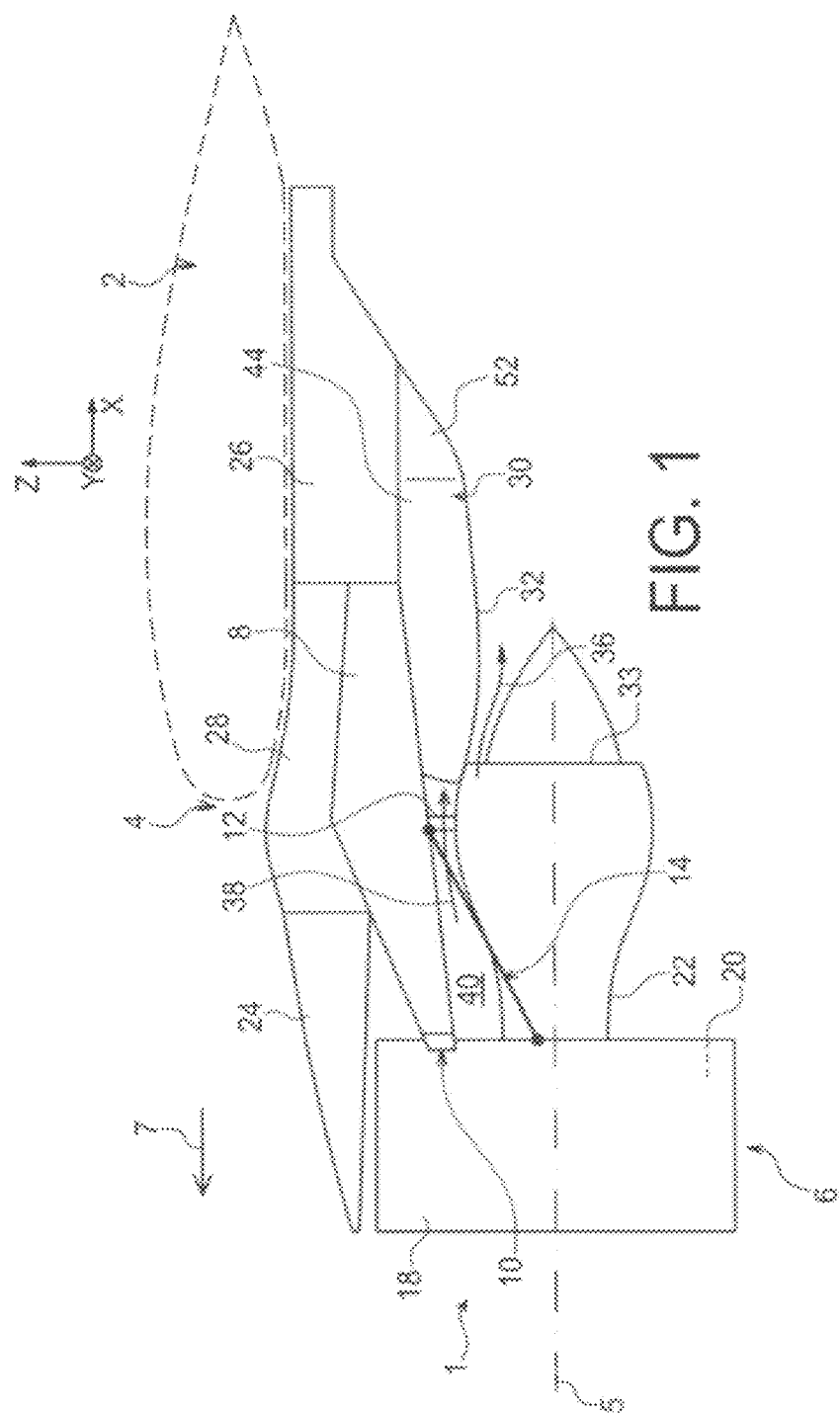
FIG. 1, already described, shows a diagrammatic side view of an aircraft engine assembly, comprising a traditional attachment pylon of the prior art.

In this assembly 1, certain elements are identical or similar to those of the prior art assembly shown in FIG. 1. In this respect, in the figures, elements bearing the same numbers correspond to identical or similar elements.

The attachment pylon 4 includes a rigid structure 108, also called primary structure, bearing attachment means for the engine 6, these attachment means having a plurality of engine attachments 10, 12 (each shown in part only in FIG. 2), as well as a take-up device for thrust forces 14 generated by the engine 6.

For information, it should be noted that the assembly 1 is intended to be surrounded by a nacelle (not shown), and that the attachment pylon 4 has another series of attachments 109, 109' attached on the rigid structure 108 and making it possible to ensure the suspension of said assembly 1 under the wing/wing system 2 of the aircraft. Each of the wing system attachments 109, 109' is also shown only partially in FIG. 2.

Two engine attachments 10, 12 of the pylon 4 are provided, and respectively called forward engine attachment and aft engine attachment. The forward engine attachment 10 is inserted between a front end of the rigid structure 108 and an upper part of the fan case 18, whereas the aft engine attachment 12 is inserted between the rigid structure 8 and the central case 22, or the exhaust case situated further back.

Moreover, the take-up device for thrust forces 14, also an object of the invention, globally comprises an axis system bearing three ball joints connecting the connecting rods to the rigid structure 108, as will be detailed later, in reference to FIGS. 6 to 8.

In this preferred embodiment of the present invention, the rigid structure 108 first comprises a box 150 extending globally in a direction X. The box is formed from a single hollow segment made in a single piece of composite material, of the resin and carbon fiber and/or glass mixture type, for example CFRP (Carbon Fiber Reinforced Plastic).

The production of this type of box can be easy and varied. It for example consists of arranging plies of composite material on a male mold, then placing the set of plies inside a light female mold, which will guarantee a precise shape for the outer surface of the box. The latter is obtained by applying fluidic pressure inside the box, which fulfills the role of compacting force against the inner surface of the box placed in a suitable furnace.

Naturally, the stacking of plies can include stiffeners, localized at predetermined locations of the box, whereof the inner surface does not require any particular finishing. Thermoplastic stiffeners can also be joined on the box after the formation thereof, on its outer surface and/or its inner surface. Nevertheless, it is preferably provided that the inside of the box 150 remains empty. It is in particular free of transverse stiffening ribs which, here, are provided outside the box, as will be detailed later.

The box 150 has a substantially square or rectangular transverse section, with corners that may be slightly rounded, which facilitates its production in a composite material. Furthermore, as will be mentioned later, transverse stiffening ribs surround and hug the outer surface of the box. As a result, ribs incorporating a substantially square/rectangular frame that hugs the box can then have reinforced zones at the corners thereof, since they can incorporate material to fill in the outer spaces left empty by the rounded corners of the box. The stiffness of the ribs is thereby strengthened.

As shown in FIG. 2, the box 150 has a section of maximum size at the two forward wing system attachments 109, 109 it supports. From this maximum-size region, the box extends longitudinally both over a small distance rearward, and over a larger distance forward, with a section having a decreasing size, and of course in a single piece, although two longitudinal sections could be considered without going beyond the scope of the invention.

As mentioned above, the rigid structure 108 is completed by a plurality of transverse stiffening ribs 152 of the box, outwardly fastened on the box 150 that they surround by fitting the outer surface thereof. Moreover, they are spaced apart from each other in direction X.

Each of these ribs 152, oriented in a plane YZ, preferably has a square/rectangular frame whereof all four corners respectively hug the upper and lower posts as well as the two lateral flanks of the box. In this way, each of them surrounds the single box segment, on which they are fastened by welding, bolting, or by any other traditional technique available to those skilled in the art. Before being fastened on the box, each rib 152 is inserted from an end of the box with a smaller section, then moved relative thereto until its frame bears on the outer surface of the box, at its permanent location. At this stage, before or after fastening of the rib on the box, the latter can be thermoplastically readjusted to enable correct assembly on the rib, while being hot reshaped directly on the outer transverse rib.

Although they are an integral part of the primary structure 108, the ribs 152, preferably metal, are cleverly used to support one or more other pieces of equipment of the pylon, or of the nacelle intended to surround the engine. They therefore have support means for supporting said equipment, preferably made in a single piece with the ribs.

One can thus see that two of the forward ribs 152 have, at the lateral sides of their frame, support means 154 for the articulated nacelle cowls (not shown), these means 154 assuming the form of fittings pierced in direction X so as to be able to house the appropriate hinges.

One of the forward ribs 152 has, at the lower side of its frame, support means 156 for the aft engine attachment 12. These means 156 assume the form of a support plate oriented downward, on which a fitting 157 is bolted forming an integral part of the aft engine attachment 12. In a manner known by those skilled in the art, the aft engine attachment is completed by another fitting (not shown) secured to the central case 22 of the engine or made in a single piece therewith, connected to the fitting 157 via connecting rods and/or clevises articulated on each of the two fittings.

Similarly, the rib 152 furthest forward has, at the lower side of its frame, support means 159 for the forward engine attachment 10. These means 159 assume the form of a support plate oriented downward, on which a fitting 161 is bolted forming an integral part of the forward engine attachment 10. In a manner known by those skilled in the art, the forward engine attachment is completed by another fitting (not shown) secured to the fan case 18 of the engine or made in a single piece therewith, connected to the fitting 159 via connecting rods and/or clevises articulated on each of the two fittings.

Furthermore, the box 150 supports, at its maximum-size section, a rib 152 equipped with support means 163 for the two forward wing system attachments 109, 109. These means 163 assume, for each of the two attachments 109, 109 arranged substantially symmetrically on either side of a vertical and longitudinal median plane of the box 150, the form of a support plate oriented laterally, and corresponding to the upper part of one of the lateral sides of the frame of the rib 152. Bolted on each of the two plates 163 is a fitting 165 that is an integral part of the concerned forward wing system attachment. In a manner known by those skilled in the art, each forward wing system attachment 109 is completed by another fitting (not shown) secured to a forward wing spar or made in a single piece therewith, connected to the fitting 165 by connecting rods and/or clevises hinged on each of the two fittings.

Furthermore, several aft ribs 152 have, at the lower side of their frame, support means 158 for a heat protection floor 32. These means assume the form of a downward rib extension, which ends with a convex surface 160 for receiving the floor 32 with a complementary shape, the outer surface 164 of which is intended to be hugged by a primary flow 36 of the engine. With this arrangement, the fairing 30 used in the prior art, called APF, is advantageously no longer required.

The ribs 152 also have, at the lower side of their frame, support means 166 for a ventilated system 170 for thermal protection of the box. These means 166 can assume different forms, for example a fastening plate, on which the ventilated system 170 is mounted globally assuming the form of a pipe extending longitudinally from one end to the other of the box, under the lower post thereof. This pipe can also pass through the lower rib extension 158 of one or more aft ribs 152, as shown in FIG. 2.

By being passed through by a cool fluid circulating in the downstream direction, this pipe, known in itself, therefore performs a heat protection function for the box relative to the heat given off by the engine.

Lastly, the ribs 152 have support means for an aerodynamic skin of the pylon, referenced 172 in FIG. 2. These support means correspond to the edges of the ribs, which offer a support surface for the skin 172. In the illustrated preferred embodiment, the skin 172, possibly obtained by assembling panels, is provided to make up the aerodynamic surface of all of the aerodynamic fairings found in the prior art shown in FIG. 1, i.e. the forward aerodynamic structure 24, the aft aerodynamic structure 26, the connecting fairing 28 and the lower aft aerodynamic fairing 30. The skin 172 is therefore provided to cover, remotely, all of the upper post and the lateral flanks of the box 150.

Thus, the forward ribs have an upper extension 178 with an outwardly curved shape, called arched, to match the identical shape of the upper parts of the forward aerodynamic structure 24 and the forward portion of the connecting fairing 28. The aft ribs have an upper extension 180 with an inwardly curved shape, called hollowed, to match the identical shape of the upper parts of the aft aerodynamic structure 26 and the aft portion of the connecting fairing 28. As shown in FIG. 2, the upper extension 178 of the forward ribs 152 is concave to receive the skin portion 172 with a complementary shape, while the upper extension 180 of the aft ribs 152 is convex to receive the skin portion 172 with a complementary shape, or to directly receive the lower surface of the wing 2 with a complementary shape.

Furthermore, the upper extension 178 of the forward ribs, in an arched shape, can be passed through by a pylon pipe, for example a heat exchanger pipe 182, traveling along the upper post of the box 150.

Figure 2A:
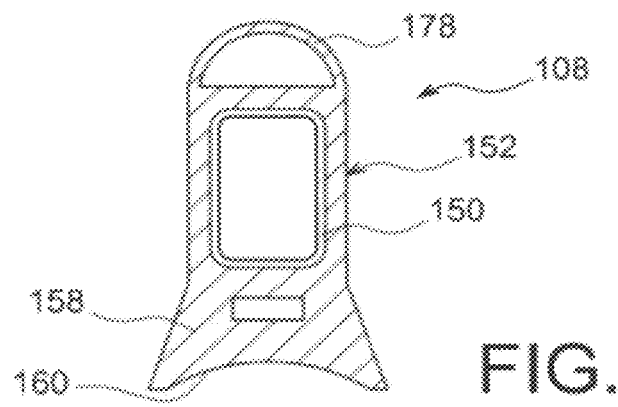
FIG. 2a shows a transverse cross-sectional view of the rigid structure of the attachment pylon equipping the assembly shown in FIG. 2, the cross-section passing through one of the transverse stiffening ribs.

FIG. 2a shows the box 150 made in a single piece of a composite material, with a substantially rectangular transverse section, with rounded corners. Each rib 152 hugs, with its frame, the outer surface of this box, over the entire perimeter thereof. In other words, the frame of the rib inwardly defines a contact surface following a closed line, on which the box is in contact, and on which it can be hot reshaped after its manufacture, owing to its thermoplastic properties.

As shown in FIG. 2a, all four corners of the frame of the rib have a reinforced mechanical strength, due to the presence of material filling in the spaces left free by the rounded corners of the box, hugged by these frame corners. Advantageously, the mechanical strength of the entire rib is increased.

Figure 2B:
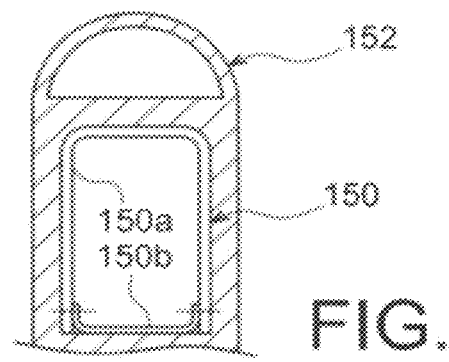
FIGS. 2b and 2c show views similar to that of FIG. 2a, in which the rigid structure assumes the form of two alternative embodiments, respectively.

FIG. 2b shows a first alternative embodiment for manufacturing the box 150, which is no longer made in a single piece, but obtained by assembling a lower longeron 150b made from a titanium alloy, and a U-shaped upper portion 150a made in a single piece with a composite material. Here, the U-shaped structure therefore forms the upper post of the box, as well as its lateral flanks. The lower longeron 150b forming the lower post of the box makes it possible, owing to the titanium alloy, to better withstand the heat given off by the engine opposite which it is located. The assembly of the U-shaped upper structure 150a on the lower longeron 150b can be done traditionally, for example by bolting.

Figure 2C:
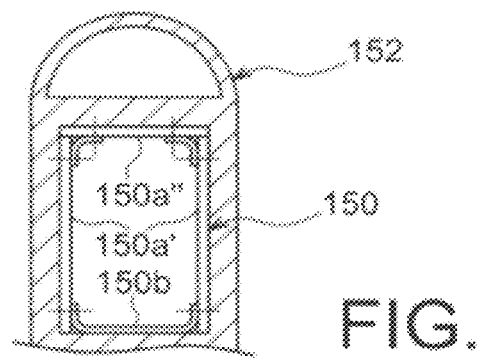

FIG. 2c shows a second alternative embodiment, resulting from the first since it consists of making the U-shaped upper structure using two lateral panels 150a' and an upper longeron 150a" fastened together, and each made from a composite material.

Figure 3:
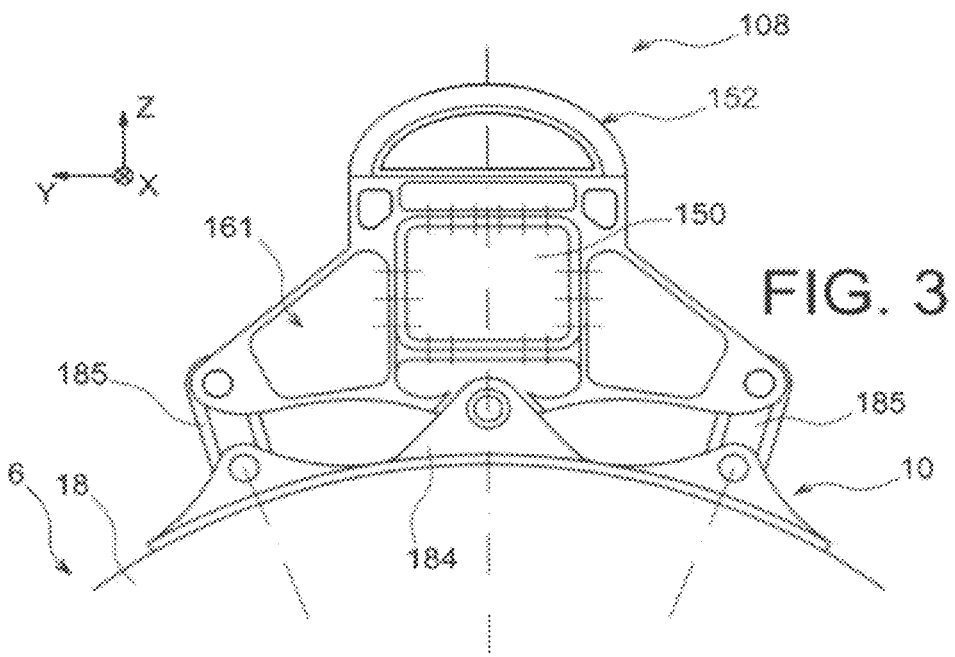
FIG. 3 shows a front view of a front part of the rigid pylon structure, in which the forward engine attachment is designed according to an alternative embodiment.

FIG. 3 shows a forward part of the rigid pylon structure, on which the forward engine attachment 10 is designed according to one alternative embodiment. In fact, it is provided here that the rib 152 furthest forward of the rigid structure is made in a single piece with the fitting 161 forming part of the engine attachment 10. This fitting 161 extends laterally on either side of the rib frame 152, and also downward from the lower side of said frame. It supports a plurality of connecting rods/clevises 185 that are mounted at one of their ends, preferably hingedly, on said fitting 161, and which are mounted at their other end, preferably also hingedly, on another fitting 184 secured to an upper part of the fan case 18, or made in a single piece therewith. Here, two connecting rods/clevises 185 are provided, respectively mounted at the lateral ends of the attachment 10. Furthermore, the central part of the fitting 161 is also hingedly mounted on a central part of the fitting 184. This mounting is preferably of the "pending" type, i.e. the forces do not travel through in a normal configuration, but only in the backup configuration when one of the two lateral parts of the attachment 10 is damaged. This central part therefore performs a so-called safety function, also called failsafe. The hinge pins here are oriented in direction X.

Figure 4:
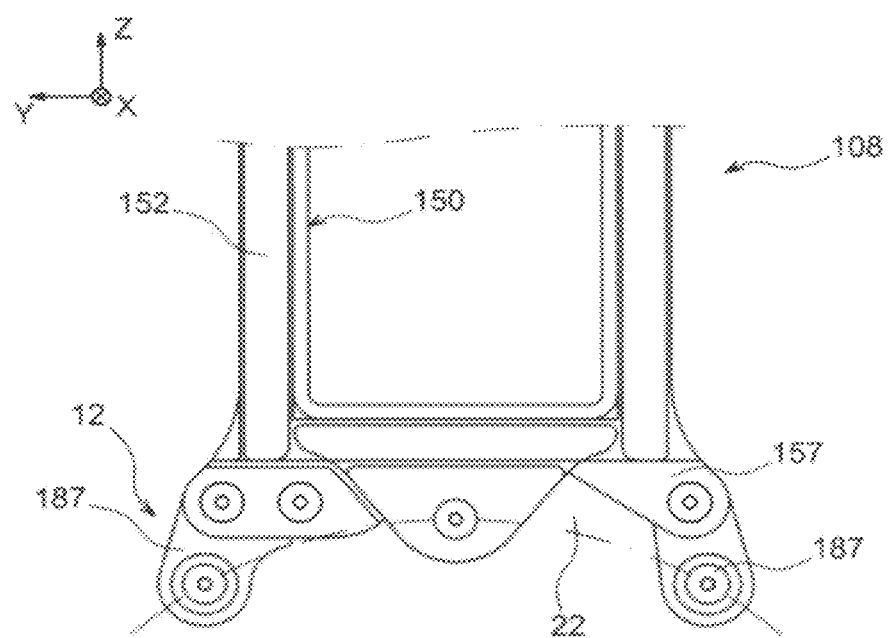
FIG. 4 shows part of the rigid pylon structure, in which the aft engine attachment is designed according to an alternative embodiment.

Similarly, FIG. 4 shows a part of the rigid structure on which the aft engine attachment 12 is designed according to an alternative embodiment. In fact, it is provided here that one of the ribs 152 is made in a single piece with the fitting 157 forming part of the engine attachment 12. This fitting 157 extends essentially downward from the lower side of the rib frame 152. It supports a plurality of connecting rods/clevises 187 that are mounted at one of their ends, preferably hingedly, on said fitting 157, and which are mounted at their other end, preferably also hingedly, on another fitting (not shown) secured to an upper part of the central case 22, or made in a single piece therewith. Here, two connecting rods/clevises 187 are provided, respectively mounted at the lateral ends of the attachment 12. Moreover, the central part of the fitting 157 is also hingedly mounted on a central part of the fitting fastened on the case 22. This mounting is preferably of the "pending" type, i.e. the forces do not travel through in a normal configuration, but only in the backup configuration when one of the two lateral parts of the attachment 10 is damaged. This central part therefore performs a so-called safety function, also called failsafe. The hinge pins here are oriented in direction X.

Figure 5:
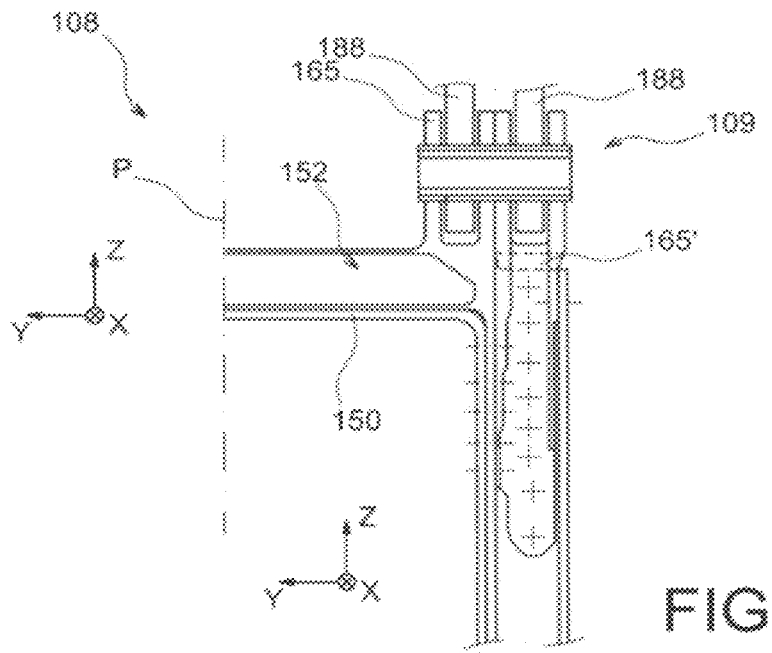
FIG. 5 shows part of the rigid pylon structure, in which the forward wing system attachments are designed according to an alternative embodiment.

FIG. 5 shows a part of the rigid structure 108 of the pylon, on which the forward wing system attachments are designed according to an alternative embodiment. In this figure, only one of the two forward wing system attachments 109 has been shown. However, it must be understood that the other attachment 109 has a symmetrical design, along the vertical and longitudinal median plane of the pylon and the rigid structure, referenced P.

Here, the forward wing system attachment 109 is designated according to an alternative embodiment. In fact, it is provided here that one of the ribs 152 is made in a single piece with the fitting 165 forming part of the attachment 109. This fitting 165 extends essentially upward from a corner between a lateral side and the upper side of the rib frame 152. It forms a yoke on which a connecting rod/clevis 188 is mounted which is mounted at one of its ends, preferably hingedly, on said yoke, and which is mounted at its other end, preferably also hingedly, on another fitting (not shown) secured to a forward longeron of the wing, or made in a single piece therewith. The hinge pins here are oriented in direction Y.

For safety reasons, the fitting 165 made in a single piece with the rib 152 is doubled by another fitting 165', which is superimposed on it in direction Y. A connecting rod/clevis 188 then connects this yoke-shaped fitting 165' to the fitting of the wing system in a manner similar to that in used for the fitting 165, described above. Moreover, a same hinge pin can pass through the two yokes housing the clevises 188, as illustrated in FIG. 5. Lastly, it is indicated that the additional fitting 165', pressed against the fitting 165, is preferably fastened by bolting on the lateral side of the rib frame 152 incorporating this same fitting 165.

Thus, in the event one of the two fittings 165, 165' breaks, the other performs a failsafe function by ensuring the passage of the forces towards the wing system.

Figure 5A:
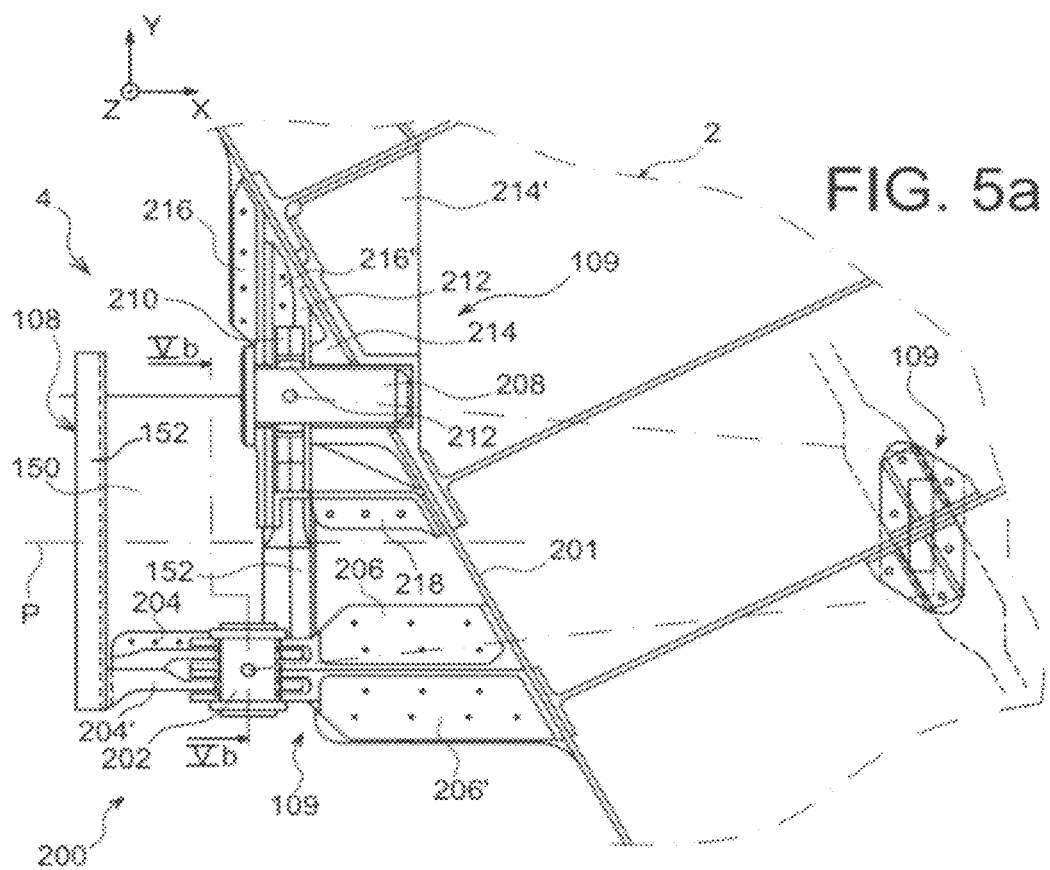
FIG. 5a shows a top view of part of the rigid pylon structure and of the wing system, in which the forward wing system attachments are designed according to another alternative embodiment.
Figure 5B:
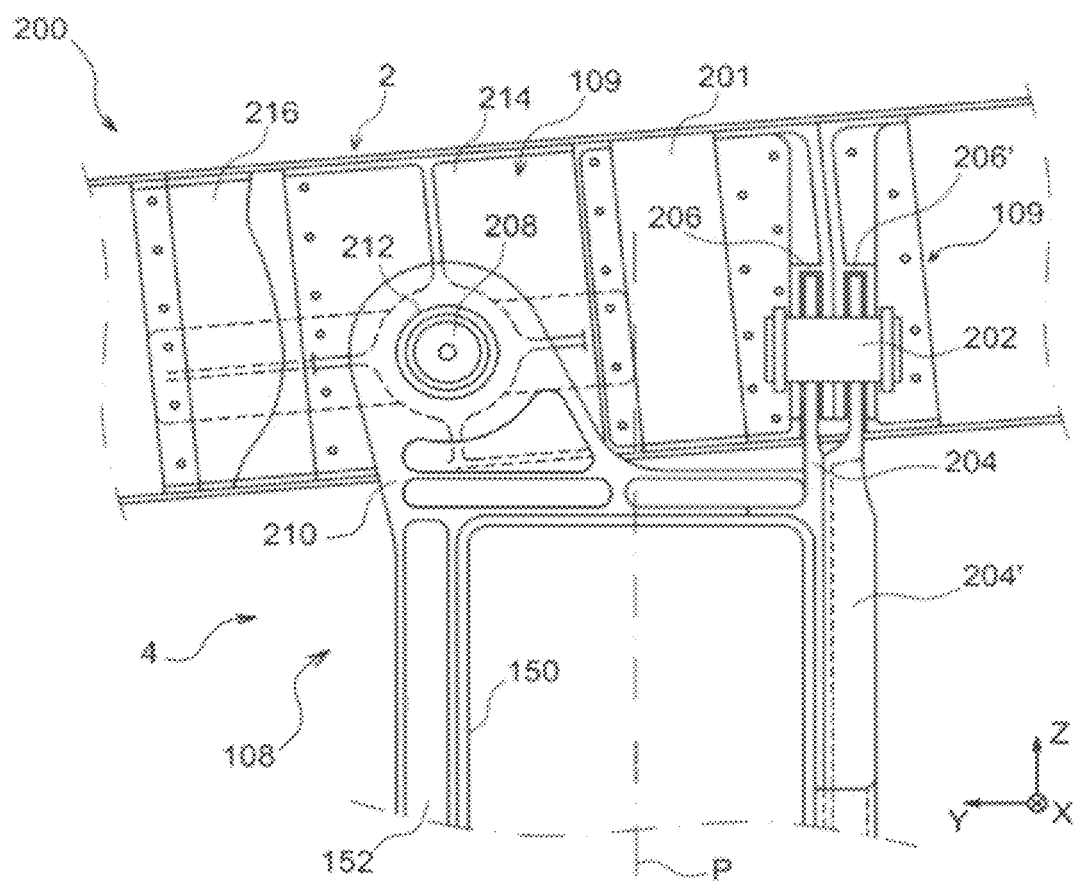
Figure 5C:
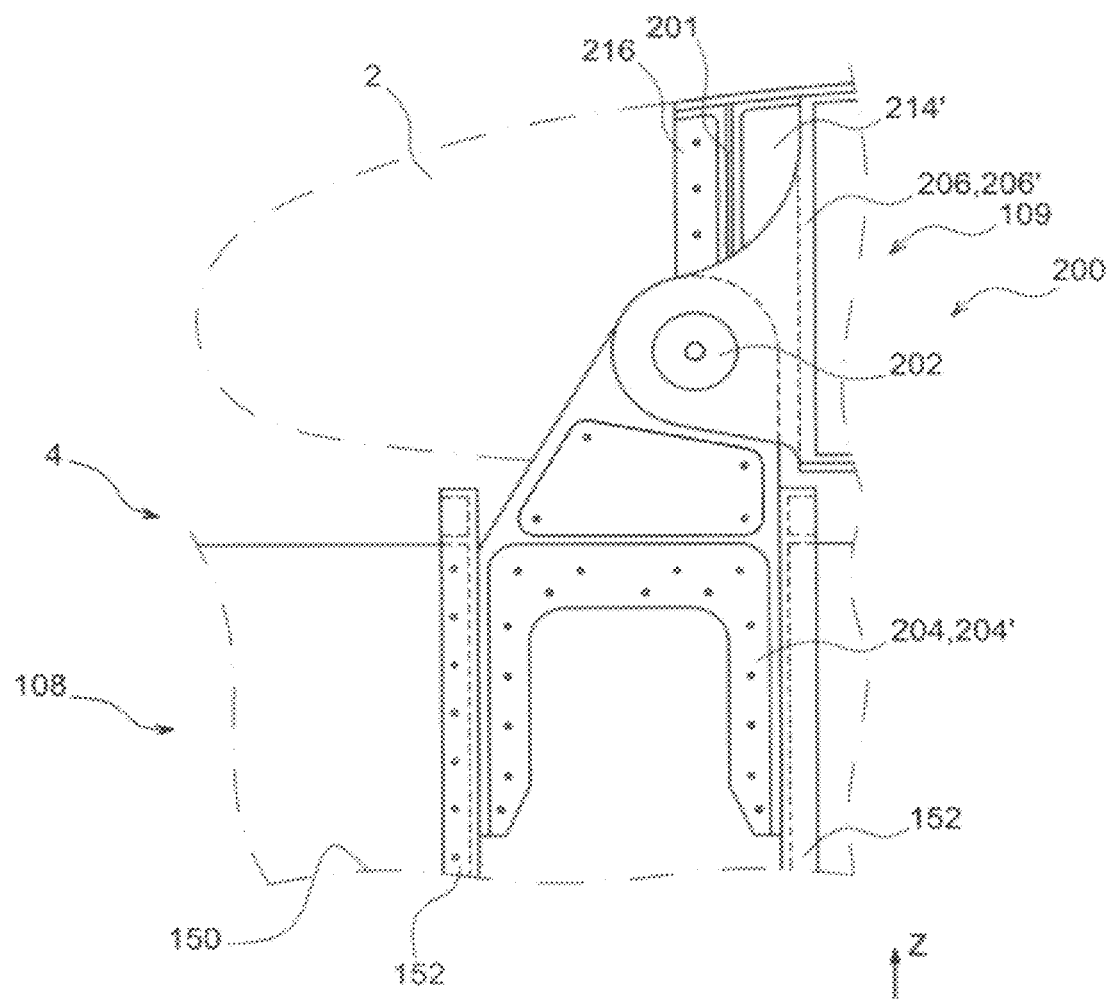

FIGS. 5a to 5c show an assembly 200 comprising the pylon 4 and the wing 2, in which assembly the two forward wing system attachments 109 are made according to still another alternative.

Here, the attachment means for attaching the rigid structure 108 on the wing 2 are formed by the two forward wing system attachments 109, and by the aft wing system attachment 109'. The latter, which is connected on a part of the wing arranged behind relative to the forward wing spar 201, assumes a conventional form, of the type formed by assembling fittings and clevises/connecting rods. It will therefore not be described further.

The two forward attachments 109, 109 are on the other hand no longer symmetrical, but still arranged on either side of the vertical and longitudinal median plane P of the pylon. They are preferably passed through by a same fictitious transverse plane of the pylon.

The first forward attachment 109, shown at the bottom of FIG. 5a, has a first shearing pin 202 oriented in direction Y. It also integrates a pylon fitting 204 attached on a lateral blank of the box 150, between two ribs 152, and protrudes upward from the upper post of the box. The protruding part, oriented in a plane XZ, defines an orifice passed through by the pin 202. As shown in FIGS. 5a to 5c, for safety reasons, the pylon fitting 204 can be doubled by an additional pylon fitting 204', which therefore performs a failsafe function. The fitting 204' is for example fastened superimposed on the fitting 204, in direction Y. It is also passed through by the pin 202. One and/or the other of these fittings 204, 204' are preferably also fastened on the lateral sides of the frames of the two ribs between which they are located, as is better visible in FIG. 5c.

Moreover, this forward wing system attachment comprises a wing fitting 206, substantially oriented in a plane XZ, and fixedly attached on the forward longeron 201. It therefore protrudes forward relative to the latter, up to a forward end in the form of a yoke housing the rear end of the pylon fitting 204, and also being passed through by the pin 202. Here also, for safety reasons, the wing fitting 206 can be doubled by an additional wing fitting 206', which therefore performs a failsafe function. The fitting 206' is for example attached superimposed on the fitting 206, in direction Y. Its front end, in the shape of a yoke, which houses the rear end of the fitting 204', is also passed through by the pin 202.

The second forward attachment 109, shown at the top of FIG. 5a, has a second shearing pin 208 oriented in direction X. It also integrates a pylon fitting 210 secured to the rigid structure, which is preferably made in a single piece with one of the stiffening ribs 152. In fact, this fitting 210, pierced with an orifice passed through by the pin 208, extends from the upper side of the frame of the rib 152, in a plane YZ. It also supports a ball joint 212 establishing the mechanical connection with the shearing pin 208.

The attachment 109 also includes a housing fitting for the pin 214 secured to the forward longeron 201. It is fastened on the forward longeron 201 by bolting, at the front thereof. It therefore has a rear support surface on the longeron 201, which is inclined in a same direction as the latter, i.e. in both directions X and Y. Furthermore, it has a front surface fitting into a plane YZ facing the pylon fitting 210. It is passed through by a pin housing orifice, making it possible to embed said pin in the fitting 214.

Thus, this pin housing fitting 214 is arranged between the forward longeron 201 and the pylon fitting 210, in direction X. For safety reasons, an additional housing fitting for the pin 214' is also provided, visible in FIG. 5a. It is secured to the forward longeron 201, bolted thereon so that said longeron is situated between the two fittings 214, 214'. Moreover, it has a pin housing orifice situated in the continuation of the orifice formed in the longeron 201, which in turn is located in the continuation of the orifice of the fitting 214. The pin 208 therefore successively passes through the housing fitting of the pin 214, the forward longeron 201, and the additional housing fitting of the pin 214'. As a result, in the event the fitting 214 fails, the forces passing through the pin 208 can be transmitted to the forward wing spar via the additional housing fitting of the pin 214', which performs a safety function, called failsafe. It must therefore be considered that the pin 208 is engaged in each of the fittings 214, 214'.

To prevent the pin 208 from being cantilevered on the fitting 214, a fitting is also provided for keeping the pin 216 arranged so that the pylon fitting 210 is situated between the housing fitting of the pin 214 and the maintenance fitting of the pin 216. The fitting 216 is oriented substantially in a plane YZ, parallel to the pylon fitting 210 that it faces. It is fastened to the forward longeron 210 directly at one of its ends, preferably by bolting, and indirectly at the other of its ends, via a connecting fitting 218. The latter, which is preferably oriented substantially in direction X, is provided to offset the incline of the forward longeron 201 in direction Y. Thus, the fittings 216, 218 and the forward longeron 201 form a right angled triangle in which the fittings 210, 214 fit, and which is passed through by the pin 208 successively passing through the fitting 216, the fitting 210, the fitting 214, the longeron 201 and the fitting 216'. In that respect, it is indicated that the fitting 216 can also be doubled by an additional pin maintenance fitting 216', still for safety reasons. This fitting 216' is then fastened superimposed on the fitting 216, in direction X.

With these different arrangements, the bottom forward wing system attachment 109 makes it possible to take up forces exerted in directions X and Z, while the top ones make it possible to take up forces exerted in directions Y and Z. Moreover, the aft wing system attachment 109' also makes it possible to take up forces exerted in directions Y and Z. As a result, these three wing system attachments that make up the attachment means enable an isostatic taking up of forces.

Figure 6:
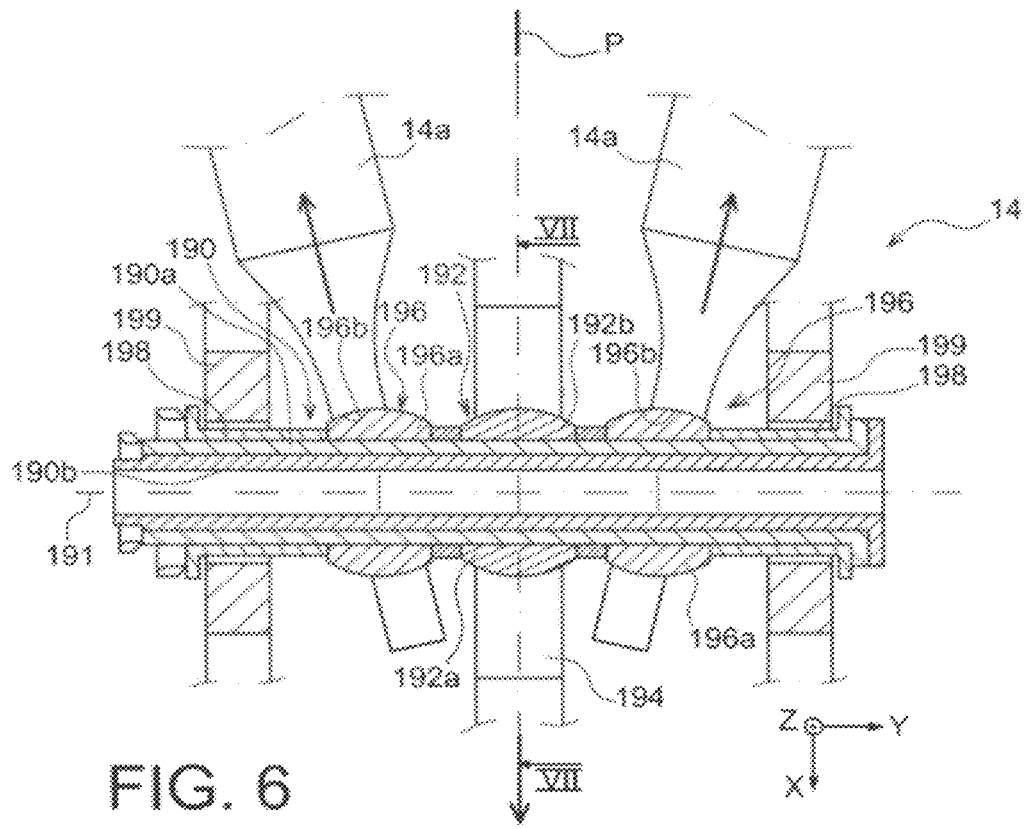
FIG. 6 shows an enlarged top view of the take-up device for thrust forces of the engine assembly shown in the preceding figures.
Figure 7:
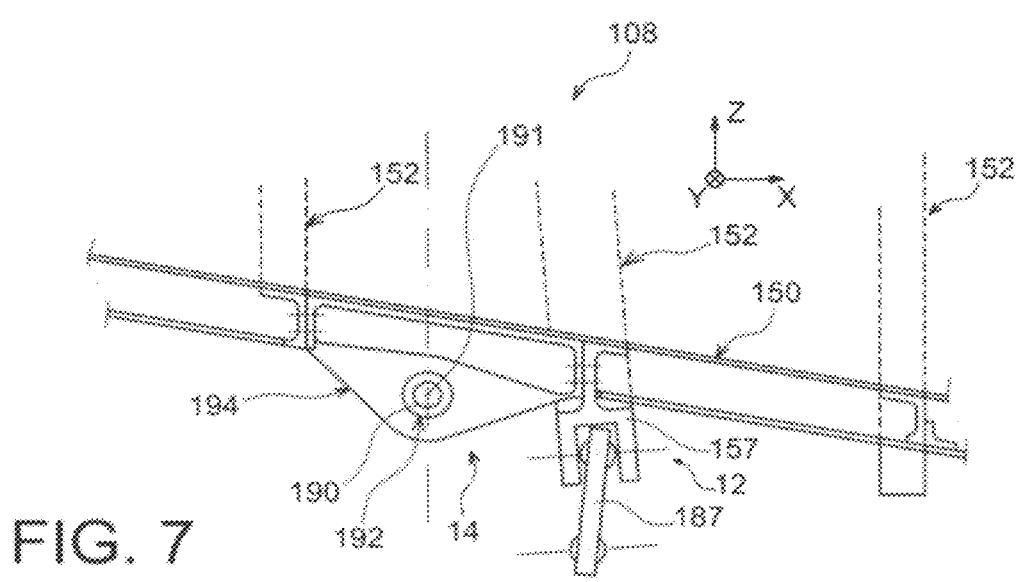
FIG. 7 shows a cross-sectional view along line VII-VII of FIG. 6.

FIGS. 6 and 7 show, in more detail, the embodiment of the take-up device for thrust forces 14, which no longer comprises a rudder bar as was the case in the prior art embodiments.

The device 14 nevertheless keeps two lateral connecting rods for take-up of thrust forces 14a, arranged symmetrically relative to the vertical and longitudinal median plane P of the pylon. These two connecting rods 14a traditionally travel forward and upward from the intermediate case of the engine on which their forward end is mounted, preferably hingedly. Still in a known manner, the hinge pins of the connecting rods 14a on the intermediate case are each substantially perpendicular to the shared plane in which the two connecting rods fit.

The device 14 comprises an axis system 190, oriented in direction Y, under the lower post of the box 150. This axis system for example comprises two concentric axes 190a, 190b, as diagrammed in FIG. 6. This doubling of the axis makes it possible to obtain a failsafe safety function, in the event one of the two breaks. More generally, the axis system comprises a single axis, preferably cylindrical with a circular section, or a plurality of concentric axes, also cylindrical with circular sections.

The axis system 190 supports three ball joints whereof the centers are aligned on the longitudinal axis 191 of the system 190, oriented in direction Y. These include a primary ball joint 192 made from a first male ball joint organ 192a, slid around the axis system 190, and a first female ball joint organ 192b, integrated into a first fitting 194. The male and female organs naturally have complementary shapes so as to form the ball joint 192, this shape corresponding to a sphere symmetrically truncated by two planes parallel to each other and orthogonal to the axis 191.

The female ball joint organ 192b is either a piece fixedly attached on the fitting 194, or made in a single piece therewith. This same fitting 194 is fixedly mounted on the rigid structure 108, for example between two directly consecutive rib frames 152. As is visible in FIG. 7, the first fitting 194 can in fact have a base bearing and fastened on the lower side of the two rib frames 152, as well as on the part of the lower post of the box 150 situated between the two ribs. The mounting is preferably done by bolting on the box and the two concerned ribs, whereof the aft rib is preferably that integrating the fitting 157 of the aft engine attachment 12.

Two secondary ball joints 196 are also provided respectively arranged on either side of the primary ball joint 192, in a direction of the axis system 190. Each of them is made from a first male ball joint organ 196a, slid around the axis system 190, and a second female ball joint organ 196b, integrated at the aft end of one of the connecting rods 14a. The male and female organs here also have complementary shapes so as to form the ball joints 196, this shape corresponding to a sphere symmetrically truncated by two planes parallel to each other and orthogonal to the axis 191.

For each secondary ball joint, the female ball joint organ 196b is either a piece fixedly attached on the aft end of the connecting rod 14a, or made in a single piece therewith.

In the example shown in FIGS. 6 and 7, the three male ball joint organs 192a, 196a therefore each have a through orifice in direction Y, making it possible to slide around the axis system 190. Their translational maintenance relative to said system 190, in the direction of the axis 191, is ensured by the presence of two bushes 198 that are an integral part of the system 190, which press these organs 192a, 196a against each other. The latter also preferably bear directly on each other, as shown in FIG. 6.

The bushes 198 are maintained for one by the head of the axis system, and for the other by the nut of said system, arranged opposite the head.

Moreover, the device 14 has backup means making it possible to ensure the transmission of forces in case of failure. These means comprise two second fittings 199 fixedly mounted on the rigid structure 108, preferably on the lower post of the box 150. The two second fittings 199 are located at the lateral ends of the device 14, so that each secondary ball joint 196 is arranged between one of these second fittings 196, and the primary ball joint 192, in the direction of the axis system. Moreover, each second fitting 196 is passed through with play by the axis system 190, at the locking bushes 198. As seen in FIG. 6, the two fittings 196 extend in planes XZ, like the first fitting 194 situated between them.

Thus, in the normal flight configuration, the engine forces passing successively through the two connecting rods 14a, the two secondary ball joints 196, the axis system 190, the primary ball joint 192, the first fitting 194, and the rigid attachment pylon structure 108. The axis system 190 can then oscillate slightly along the center of the primary ball joint 192, preferably in the plane of the connecting rods, because the permanent balance of the forces passing through the two connecting rods. Nevertheless, the device 14 is designed so that the oscillations of the axis system have a low enough amplitude not to abut against the second fittings 199, by which no force passes under normal flight conditions.

Figure 8:
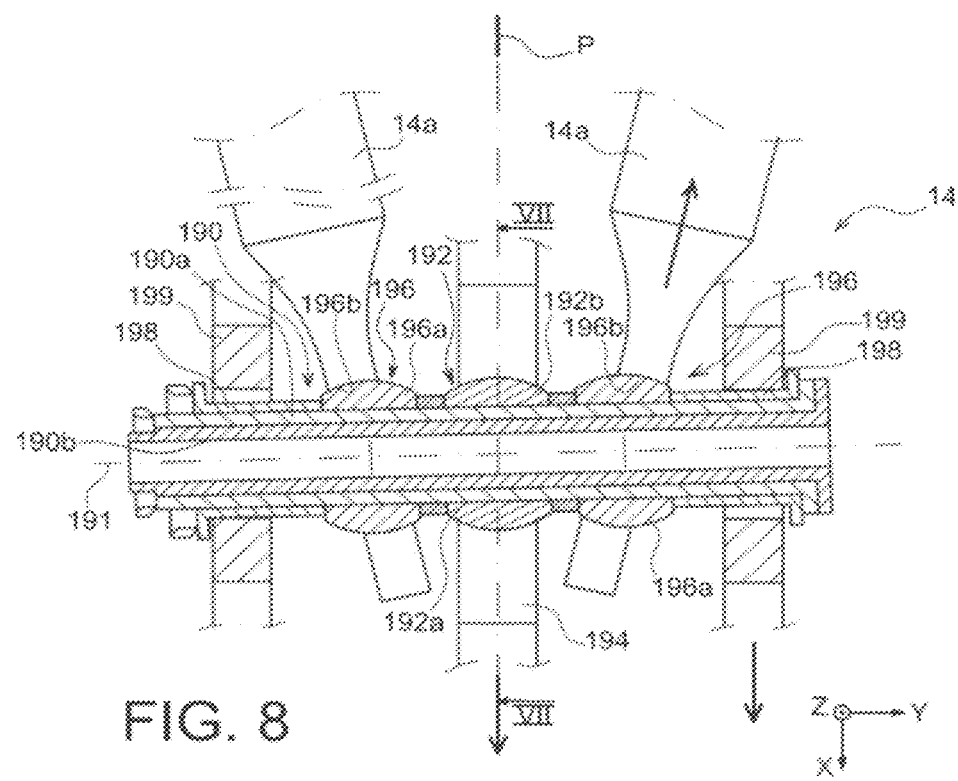
FIG. 8 shows a view similar to that of FIG. 6, in which the take-up device for thrust forces has been shown in a configuration as adopted after the accidental break of one of its two lateral connecting rods.

However, in the event of an accidental failure occurring on the force path between one of the connecting rods 14a and the axis system 190, such as for example the break of the left connecting rod in FIG. 8, the thrust forces then only pass through the other connecting rod, on the right. This leads first to only stressing the axis system 190 by the right connecting rod, which causes the system 190 to rotate around the center of the primary ball joint 192, until the initial play between the axis system 190 and the second fitting 199, associated with the active connecting rod, has been completely consumed.

After the quasi-instantaneous obtainment of the stop between these elements, the engine forces successively pass through the non-failing connecting rod 14a, the axis system 190, the two primary 192 and secondary 196 ball joints, the two fittings 194, 199, and the rigid structure 108 of the attachment pylon. The "failsafe" safety function is therefore fully ensured.

Of course, various changes can be made by one skilled in the art to the invention just described, solely as non-limiting examples. For example, it is in particular possible to indicate whether the engine assembly 1 has been presented in a configuration adapted so that it is suspended under the wing system of the aircraft, this assembly 1 could also assume a different configuration allowing it to be mounted above this same wing system, or at the aft portion of the fuselage.

The invention claimed is:

1. A take-up device for transferring thrust forces for an attachment pylon of an aircraft engine, said device comprising:
   a first fitting which is secured to a rigid structure of the attachment pylon;
   two lateral connecting rods which transfer the thrust forces from the aircraft engine to the attachment pylon; and
   an axis system including three ball joints arranged along a first axis of the axis system, the three ball joints being a primary ball joint and two secondary ball joints arranged on either side of the primary ball joint,
   wherein said first fitting is provided with the primary ball joint, and
   an end of each of the two lateral connecting rods is provided with one of the two secondary ball joints.

2. The device according to claim 1, wherein centers of the primary and secondary ball joints are aligned on the first axis of the axis system.

3. The device according to claim 1, further comprising:
   two second fittings which are secured to the rigid structure of the attachment pylon,
   wherein the two second fittings are arranged such that each of the two secondary ball joints is arranged between one of the two second fittings and the primary ball joint, in a direction of the first axis of the axis system, and each of the two second fittings is passed through with a play by said axis system.

4. The device according to claim 3, wherein each of the two second fittings is disposed on each end of the device in a lateral direction.

5. The device according to claim 4, wherein in an event of failure of one of the two lateral connecting rods, the axis system is rotated around a center of the primary ball joint until the play between the axis system and one of the two second fittings corresponding to the other of the two lateral connecting rods is completely consumed.

6. The device according to claim 1, wherein the other end of each of the two lateral connecting rods is to be connected to the aircraft engine.

7. An aircraft engine attachment pylon comprising:
   a rigid structure; and
   a device for transferring thrust forces according to claim 1.

8. An aircraft engine assembly comprising,
   an engine attachment pylon according to claim 7; and
   an engine fastened on said engine attachment pylon.

9. An aircraft comprising:
   at least one engine assembly according to claim 8.

10. The device according to claim 1, wherein the axis system has a cylindrical shape with a circular cross-section.

11. The device according to claim 1, wherein the two lateral connecting rods are arranged symmetrically with respect to a vertical and longitudinal median plane of the attachment pylon.

12. The device according to claim 1, wherein each of the three ball joints has a through orifice in a direction of the first axis of the axis system.

13. The device according to claim 1, further comprising:
   two bushes that are integral with the axis system.

14. The device according to claim 13, wherein the two bushes are disposed on an outer circumferential surface of the axis system.

* * * * *